May 30, 1950 V. P. ZIERKE 2,509,950
HOIST FOR LOADING HEAVY TRACTOR TIRES
Filed Jan. 20, 1948 2 Sheets-Sheet 1

INVENTOR.
V. P. ZIERKE
BY Bryant & Lowry
attys.

May 30, 1950      V. P. ZIERKE      2,509,950
HOIST FOR LOADING HEAVY TRACTOR TIRES
Filed Jan. 20, 1948      2 Sheets-Sheet 2
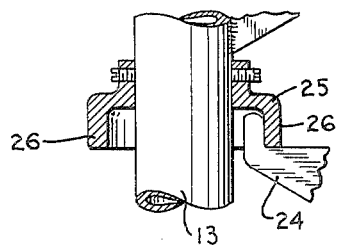
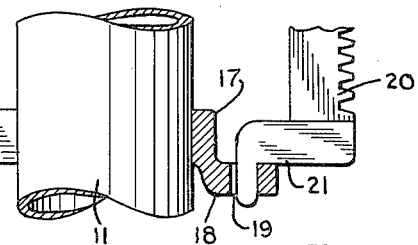
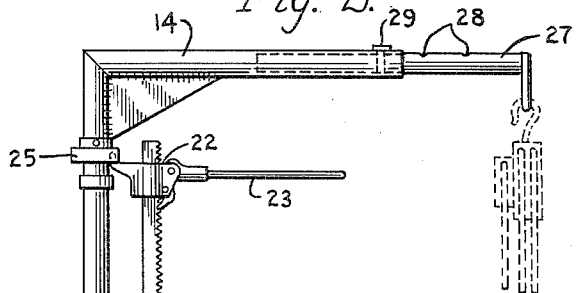
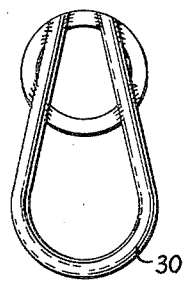
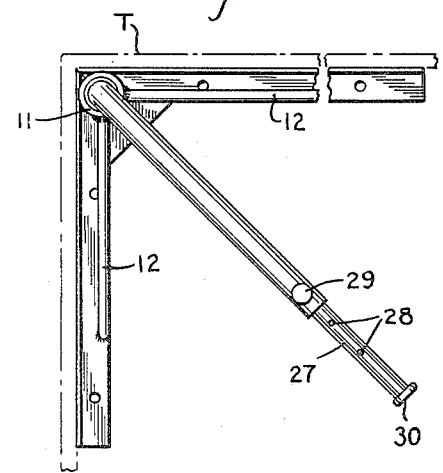
INVENTOR.
V. P. ZIERKE
BY Bryant & Lowry
Attys.

Patented May 30, 1950

2,509,950

UNITED STATES PATENT OFFICE 2,509,950

HOIST FOR LOADING HEAVY TRACTOR TIRES

Vernon Paul Zierke, Charles City, Iowa

Application January 20, 1948, Serial No. 3,228

5 Claims. (Cl. 212—55)

This invention relates to a truck mounted hoist for loading and unloading the heavy tractor tires commonly used and which often weigh up to and more than 1,500 pounds for each tire.

The loading of such tires as commonly practiced requires much manual strength and labor, and the unloading of such tires not only requires much labor but also is attended with considerable risk of bodily injury since, in unloading, these heavy tires are usually rolled off the truck on which they are carried and may bounce in any direction with possible injury to persons standing near.

It is the principal object of the present invention to provide a novel form of crane-like hoist permanently mounted on a truck and by means of which one man may safely and expeditiously load and unload such heavy tires onto and from a truck of ordinary construction.

Another object of the invention is to provide a novel construction of this character wherein the height of lift may be regulated to suit the prevailing conditions.

A further object of the invention is to provide a novel construction whereby the length of the lift arm may be varied as desired.

A still further object of the invention is to provide a novel ratchet means whereby the extent of lift of the device may be regulated.

With the above and other objects in view, as will be presently understood, the invention consists in general of certain novel details of construction and combinations of parts hereinafter fully described, illustrated in the accompanying drawings and particularly claimed.

In the accompanying drawings like characters of reference indicate like parts in the several views, and Figure 1 is a perspective view showing the general assembly of the device on a forward corner of the body of an automobile truck;

Figure 2 is an elevation of the device shown as removed from the truck;

Figure 3 is a plan view of the device with the corner of the truck shown in broken lines;

Figure 5 is a second enlarged section showing the lower means for holding the ratchet bar used herewith;

Figure 6 is a section showing the means for engagement by the ratchet member;

Figure 7 is an end view of the arm of the lift and showing the hanger for engaging the upper block of a chain hoist for use in connection with this invention.

Figure 4:
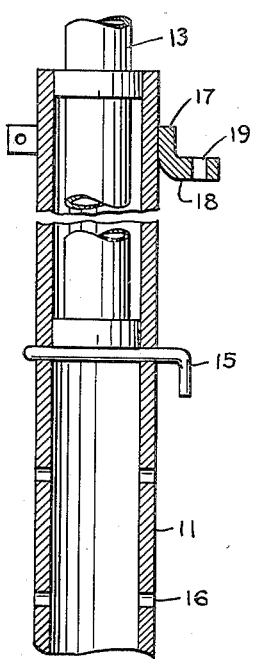
Figure 4 is an enlarged detail section on the line 4—4 of Figure 2.
Figure 1:
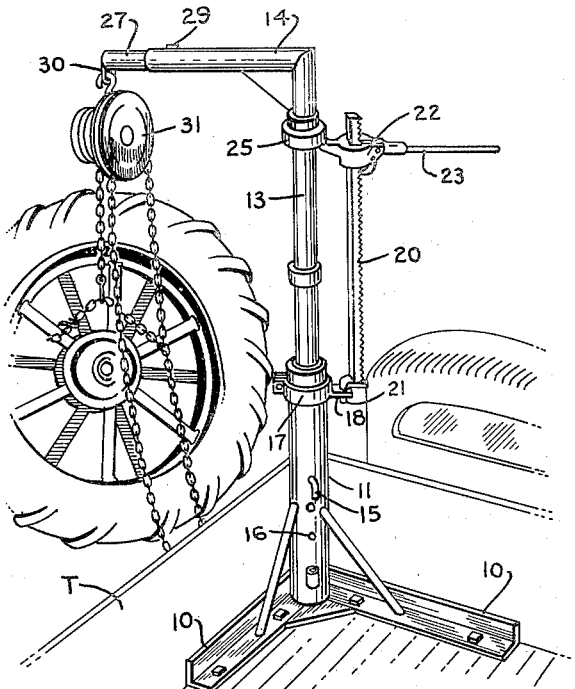
Figure 8:
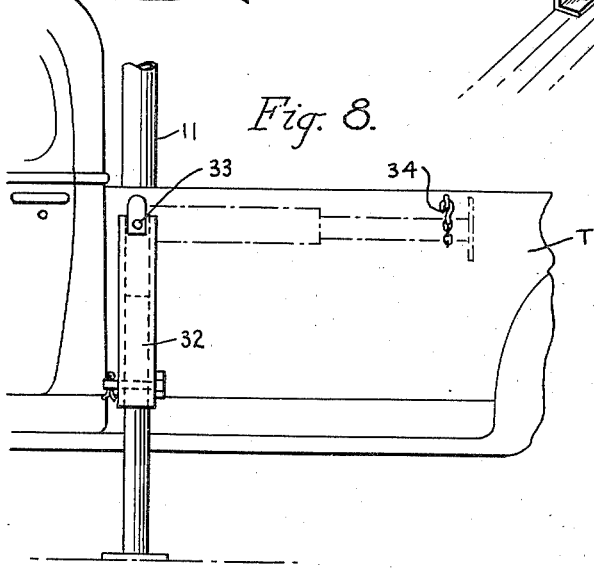
Figure 8 is a side elevation of a prop or body-bracing formation for use in connection with this invention.

The invention presents a number of general aspects bearing on its service and which tend to control some of the structural characteristics; a brief showing of these is made to permit of a clearer understanding of the detail structure.

A basic feature of the invention is the fact that the structure is permanently positioned on the commodity-carrying bed of the trunk—thus being instantly available for service at any point regardless of location; to avoid material interference with commodities carried by the truck, the base is of skeleton type and located in a corner of the commodity-carrying zone of the truck body. Since the hoist must be capable of transferring commodities between outboard and inboard positions, the vertical post assembly must have a vertical length sufficient to raise the commodity from its position on the bed to a height able to clear the sides of the bed in moving the commodity outboard or inboard; to permit usual truck travel between points in presence of the assembly, the vertical post assembly is made telescopic so that its length during truck travel may not interfere with overhead conditions—when telescoped the assembly projects but a small distance above the top plane of the driver's cab.

The telescoping arrangement permits rotation of the inner member of the post assembly about its axis, thus permitting the lateral arm carried by the top of the inner member to swing inward or outward, the lateral arm also being formed for partial telescoping to thereby permit the hoist to carry its chain hoist to any part of the truck bed for picking up or delivering a commodity member, the extensible arm carrying a loop on which a standard chain hoist may be secured. During travel the post assembly and the arm are in telescoped position, being moved to active positions when the point of service is reached.

The following description presents the detailed structures by which the above regimens may be carried out.

In the present embodiment of the invention, there is provided a skeleton base formation consisting of a pair of angle irons 10 arranged at right angles to each other so that they may fit in a corner of the commodity-carrying body of a truck body T. Mounted at the junction of the angle irons 10 is a lower tubular post section or outer member 11 braced to the angle irons 10 by braces 12. Telescopically mounted in this lower section or outer member 11 is an upper post section or inner member 13 having a tubular inner arm section 14 extending at right angles from the top of the post section or member 13. The post section 13 is supported in the post section 11 by a removable pin 15 selectively positioned in one of the holes 16 formed in the lower post section or member 11. This latter arrangement permits ready control of the position of the inner member when in service. In practice, the inner member 13 is first raised by the ratchet mechanism, presently described, to a height above the desired service height, after which pin 15 is inserted within the holes 16 exposed nearest to and below the lower end of the member 13, the member then being lowered into contact therewith. This locates arm 14 at a desired height and at the same time enables the pin to form a positive support for the inner member and the weight carried by its chain hoist, relieving the ratcheting mechanism from being required to support this weight. When activities at the point of service end, and it is desired to collapse the post assembly, the member 13 is slightly raised by the ratcheting mechanism, and the pin removed, after which member 13 is lowered to its telescoped position by ratcheting mechanism activity.

On the upper part of the member 11 is a clamping band 17 having an arm or leg 18 provided with a hole 19.

At 20 is a ratchet bar having an offset carrying depending finger 21 engaging the hole 19. On this ratchet bar is slidably mounted a collar 22 carrying a pawl lever 23 for engagement with the rack 20. Projecting opposite the lever 23 is a finger 24 having an upturned end. Fixed on the upper post section 13 is a collar 25 having a peripheral depending flange 26 behind which the upturned finger of the arm 24 engages, this arrangement permitting the post to rotate, with the finger on the arm 24 in engagement with the collar 25. The specific details of the ratcheting mechanism, other than those within the end zones of the mechanism, are not described as to detail, since they are more or less standard in certain types of lifting jacks; the end zones, however, are designed specifically for the present service.

An outer crane arm section 27 is telescoped in the inner section 14 and is provided with spaced holes 28 wherethrough a pin 29, passing through a hole in the arm 14 may engage selectively to regulate the length of the crane arm.

Welded to the outer end of the crane arm formed by the members 14 and 27 is a suspension loop 30 for suspending a chain hoist 31.

On the outside of the truck near the crane is a telescopic strut 32 which is pivoted at 33 and may be held in inoperative position by a chain loop 34.

In practice, when the truck is to be loaded, the truck is driven to the loading point, the post assembly raised to the required height, arm 14 swung outboard, and the chain hoist lowered and secured to the commodity; the chain hoist is then actuated to raise the commodity to clear the sides of the truck body, after which inner member 13 is rotated to swing arm 14 inboard and position the end of the arm at a desired point to permit lowering of the commodity onto the bed of the truck—the regimen being repeated for each of the commodity loads being moved inboard. The post assembly is then lowered.

When a commodity unit is to be unloaded at a desired point, the truck is driven to such point and the regimen repeated in reverse order, the post assembly being raised, arm 14 swung to the desired position inboard, the chain hoist lowered to secure the commodity member, after which the hoist is raised to clear the commodity passage over the trunk sides, arm 14 swung to outboard position, after which the chain hoist will lower the commodity to the desired point. At the close of the delivery, the post assembly is placed in its telescoped position.

If the commodity is, for instance, a heavy truck or tractor tire, and it is desired to deliver it to a point of application to the wheel of the tractor or other structure for which it is designed for service, the laden truck is driven to the immediate vicinity of the point of application where the wheel of the structure has been prepared to receive the tire, the unloading regimen then followed but with the outboard lowering such as to locate the tire in position for application; the invention thus aiding in this service, and being returned to telescoped position upon completion of the application. Should the commodity be the entire wheel, the same regimen is followed, the application then being the mounting of the wheel on the wheel spindle.

It will be noted that these services require the activity of but one man.

What is claimed is:

1. In commodity handling assemblages for delivery trucks and adapted for heavy-duty service, wherein the assemblage is manually operative for transferring a heavy commodity between inboard and outboard positions relative to the commodity-carrying bed of the truck at will, an assemblage of such type comprising a vertically extending post assembly including a skeleton two-arm base formation of approximately right-angular contour with the post rising from the apex zone of the angle to thereby permit permanent location of the assemblage in a corner of the commodity-carrying bed of the truck, said post assembly also including a pair of axially alined members telescopically arranged with the outer member secured to such base and with the inner member movable vertically therein and projecting from the upper end of the outer member; said inner member having a laterally extending tubular arm carrying an adjustable extension arranged telescopically within and projecting from the tubular arm, the free end of the extension carrying a downwardly extending loop for removably supporting a manually-operative hoisting mechanism, and a ratcheting assembly of extended length supported at its lower end in the upper end zone of the outer member of the post assembly, said ratcheting assembly extending upwardly from such supporting point externally of and approximately parallel to such inner member of the post assembly and presenting a toothed ratcheting face, said ratcheting assembly including a ratcheting instrumentality cooperative with the toothed face to effect step-by-step adjustment of the instrumentality lengthwise of the ratcheting assembly, said instrumentality having a finger adapted to engage an underlying face of an annular element carried by the inner member of the post assembly, whereby the inner member of the post assembly is adjustable vertically relative to the outer member of such post assembly step-by-step and is rotatable in either of its adjusted positions to permit swinging of the outer end of the tubular arm between inboard and outboard positions relative to the commodity-carrying bed of the truck body at will.

2. An assemblage as in claim 1 characterized in that the base formation includes a pair of angle-iron arms connected together at one end to form a substantially right-angled structure with the connected ends forming the apex of the angle, each arm having a planar face adapted to rest upon and to be permanently secured to the commodity-carrying face of the truck bed within a corner zone of such bed, with a similar face contacting a side or end wall of the bed, whereby the assemblage is permanently positioned between the side and ends of the truck bed without materially affecting the commodity-carrying capacity of such bed.

3. An assemblage as in claim 1 characterized in that the finger of the ratcheting instrumentality projects upward, and further characterized in that the annular element is in the form of an inverted cup-shaped member adjustably mounted on the inner member of the post assembly, said finger extending into the interior of the cup-shaped member through its open end and adapted to support and control the vertical movements of such inner member of the post assembly between its inactive and the selected active position of the latter.

4. An assemblage as in claim 1 characterized in that the outer member of the assembly is provided with a succession of spaced openings on diametrically opposite sides of the member for the reception of a removable pin to thereby permit the inner member of the post assembly to be positioned in completely telescoped position during inactivity of the assemblage and during truck traction, the assemblage being subject to a loading or unloading regimen at the point of service with the regimen including raising the inner member of the post assembly from its inactive position to a point above the desired active position to permit insertion of the pin in a selected pair of openings and then lowering the member into contact with the positioned pin, whereby the pin will form a support for the member during the loading or unloading activities and be removed at close of the latter to permit return of the assemblage to inactive position.

5. In combination, a delivery truck, an assemblage as in claim 1 anchored to and within the body of the truck, said body having at least one body-bracing formation located on the outer face of the bed body in the vicinity of the post assembly, said formation being adjustably telescopic and movable between active and inactive positions to thereby brace the body zone carrying the assemblage against downward stresses during activity of the assemblage in loading or unloading the truck.

VERNON PAUL ZIERKE.

REFERENCES CITED

The following references are of record in the file of this patent:

UNITED STATES PATENTS

| Number | Name | Date |
| --- | --- | --- |
| 859,146 | Stewart | July 2, 1907 |
| 866,638 | Ewers | Sept. 24, 1907 |
| 924,550 | Hall | June 8, 1909 |
| 1,134,707 | Stone | Apr. 6, 1915 |
| 1,406,302 | Tobias | Feb. 4, 1922 |
| 2,023,790 | Ormsby et al. | Dec. 10, 1935 |